UNITED STATES PATENT OFFICE.

MICHEL EDMOND SAVIGNY, OF NEW YORK, N. Y.

DYEING-EXTRACT.

SPECIFICATION forming part of Letters Patent No. 308,706, dated December 2, 1884.

Application filed August 8, 1884. (No specimens.) Patented in England January 9, 1884. No. 1,031.

*To all whom it may concern:*

Be it known that I, MICHEL EDMOND SAVIGNY, a citizen of the Republic of France, and a resident of the city of New York, State of New York, United States of America, have invented a new and useful coloring-matter, made from the so-called "red-colored tannic wood and plants," and which possess the characteristics of the class of coloring-matters known as "catechus," or "Indian catechus," although different therefrom, the woods or plants treated by me for the production of these coloring-matters being principally found in America. I do not limit myself, however, to coloring-matters produced solely from American woods or plants.

The following is a full, clear, and exact description of the process by which I obtain my said coloring-matter, and it is practiced in the treatment of such plants and woods as contain coloring-matter in sufficient quantity to be practically useful in the arts for dyeing woven fabrics, furs, skins, wood, or other articles to which it is desired to give an artificial color. These woods or plants contain, also, in addition to the coloring-matters, the substance known as "tannin." The woods and plants containing coloring-matter combined with tannin may be divided into tannic woods and plants colored red and tannic woods and plants colored yellow.

My coloring-matters claimed in this specification are obtained from the treatment of the tannic plants colored red. When a wood or plant contains tannin, or, in other words, tannic or gallic substances, and little or no coloring-matter, either red or yellow, it is usually easy to obtain therefrom all the extractive substances by simply treating it with boiling water; but it is different when the wood or plant contains at the same time a large proportion of tannin and also a large proportion of coloring-matter. In such case pure water even at a boiling temperature will dissolve only a portion of the tannin, much of it remaining in the wood, and with it most and sometimes all the coloring-matter. In order to obtain the coloring-matter and the tannin from these woods and plants—*i. e.*, those containing tannin and coloring-matter in large quantities various processes have heretofore been employed, but in them all strong applications of alkali or alkaline salts, usually in solution, have been employed to act as solvents on the coloring-matter and the tannin. Now, the use of alkali or alkaline salts seriously deteriorates the dyeing quality of the resulting extracts, especially those obtained from red-colored tannic plants, because the coloring substance contained in them being less soluble than that of the yellow-colored tannic plants their manipulation requires the use of stronger preparations of alkali or alkaline salts; and this deterioration of the dyeing quality of the extracts cannot be wholly rectified. The degree of deterioration, however, varies somewhat with different plants. By my process I am enabled to secure all the extractive coloring substances contained in such woods or plants without the deterioration stated by me incident to the use of alkalies or alkaline salts, as heretofore used, with very beneficial results to the extract, as hereinafter set forth.

It is a well-known fact that the elements or constituent parts of natural tannin—*i. e.*, tannin as it is found in plants in its normal state—do not separate or decompose under the influence of oxidation effected by fermentation or by the use of acids, but, on the contrary, such oxidation does affect the coloring-matter combined with the tannin, under certain conditions decomposing it, rendering it worthless, and under different conditions giving it unexpected strength or vitality and stability. It is, therefore, possible by proper manipulation and treatment, and without danger of altering the tannic condition of the resulting extract or its coloring properties, to submit the plant to a process of oxidation by means of fermentation or by the use of acids which accomplishes the extraction of the tannin and coloring-matters contained in the plant, which process, being properly conducted, will not only not injure the coloring substance, but, on the contrary, will increase its strength, vitality, and stability.

As above stated, the oxidation of the plant may be effected either by a process of fermentation or of oxidation by means of acids, the result of both being the same in my process, the chemical principle involved being the same in both cases, and both are the same in practice and in result—*i. e.*, both effect the oxidation of the plant, and neither affect its tannic properties. The acids, however, are somewhat quicker in their action. They should be diluted, if very strong, so as not to destroy the coloring-matter by altering or destroying the ligneous portions of the plant in which the coloring-matter is contained. After the wood or plant has been submitted to the fermentation or the oxidation by the use of the diluted acids, as the case may be, I obtain my first extract. The residues then remaining may be further treated with alkaline bodies in the same manner as formerly, if desired; but since such former use of alkaline substances is detrimental to the resulting extract, I prefer to continue the process by treating the residues with a specially-prepared compound consisting of an oily or fatty substance in combination with an alkaline substance, whereby saponification is effected.

To practice my process I proceed as follows: In suitable vats, barrels, or other appropriate receptacles adapted in any desired manner to heat their contents I place the woods or plants which I desire to treat, having first crushed or bruised them or reduced them to a powder, shavings, or other finely-divided parts. When the wood or plant is reduced to powder, I prefer to mix with it finely-powdered or comminuted charcoal, pumice-stone, or other similar body capable of favoring the operation of the leaven which I use to effect the fermentation, the proportion being about ten pounds of charcoal or five pounds of pumice to one hundred pounds of the wood or plant; but these proportions are not at all arbitrary, but will be found to vary according to the fermenting force that may be required. This will be determined by the nature of the wood or plant being treated. The leaven used may be ordinary brewer's yeast, or any other leaven capable of inducing fermentation. To the mass thus obtained I add enough tepid water to form a pulpy mixture of about the consistency of a stiff mush. If the wood or plant is bruised or crushed, or reduced to fragments simply, and not to a powder, I then add enough tepid water to thoroughly soak the same, and in such case I do not use the charcoal, pumice-stone, or similar substance. After the water has thoroughly saturated the pulp or the bruised, crushed, or finely-divided fragments, as the case may be, I add the leaven, or the acid diluted in water, as the case may be, to effect the oxidation. The proportion of leaven is about one-half pound (taking brewer's yeast as the example) to one hundred pounds of wood or plant, and the proportion of the diluted acid is about five hundred grams to one hundred pounds of wood or plant, the acid being diluted or dissolved in water to make a reduced solution. The proportion of water to acid is dependent on the kind of acid employed, and also on the particular kind of wood being treated; but in the instance of hemlock-wood and muriatic acid of 22° strength the proportions would be about three quarts of acid to one hundred gallons of water. The acids which I prefer to use are chlorohydric and nitric acids, because they are more easily eliminated from the resulting extract than most if not all the other acids, and this elimination of the acids from the extract is desirable, in order that it may be as nearly neutral as possible. I secure this elimination of the acids preferably by evaporation under the action of heat.

In addition to the acids named I use the following, depending upon the nature of the plant treated: tartaric, oxalic, malic, sulphuric, &c. If desired, I may use such acids or acid salts as are capable of producing oxidation. After the admixture of the leaven or the acid, as the case may be, with the wood or plant, and the charcoal or pumice-stone, when used, I allow the mass to stand for about twenty-four (24) hours, for the purpose of effectually inducing the fermentation or the oxidation by the acids. At the end of that time I add more water, and raise the temperature of the mass by steam or in any other desired manner to about 120° to 150° Fahrenheit, and stir the mass, say, every hour. I repeat the stirring at intervals of about an hour and maintain it at about 120° or 150° Fahrenheit for a period, when acid is used, of about two days, thus securing perfect oxidation. This is the practice, whether the oxidation is effected by the use of the leaven causing fermentation or by the use of acids, with the difference only that the fermentation process requires a longer time. As a general rule the entire process, when acid is employed, requires about three days, and when leaven is used from a week to ten days. The proper time to discontinue the process will be readily ascertained by the appearance of the scum on the top of the mass, which will have a deep orange-color. When this takes place, I raise the temperature of the mass until it reaches the boiling-point, and maintain it there for about an hour. I then draw off the resulting liquor in any desired manner. The liquor will be heavily charged with tannin and with coloring-matter, and upon evaporation as usual results in my first product or extract, which is, as stated, a strong decoction of the tannin and the coloring-matter. It is noticeable that when the liquor is first drawn off it appears to contain but little coloring-matter. The contrary, however, is the fact. It rapidly grows darker during evaporation, which is effected by heat. The liquor seems further to oxidize by the action of the heat.

I can produce my colors by the above-stated treatment of all the red-colored tannic woods and plants—such as hemlock, beech, cedar, mahogany, elm, hazel, or filbert, divi-divi, quebracho, red cinchona, tamarind, willow-bark, briar-root, the various coniferous plants, and, in fact, all woods and plants possessing the qualities and characteristics of those mentioned.

My first extracts obtained as above described compare very favorably with the favorite brands of "Indian catechus," so called; and, more than the Indian catechus, and more than any other similar extract, they incline to reddish brown under the influence of bichromates and manganates of potash or of alkaline sulphurets, and to gray under the influence of ferric salts, and, aside from these distinguishing characteristics, the coloring-matter secured by me as above stated can be readily distinguished from all other like coloring material by reason of its possessing an acid taste, being free from all alkaline trace, and for the same shade of color the powder or granules appear much lighter in color than the granules or lumps of Indian catechus, or other coloring-matter of the same shade, and the granules of my products are translucent, whereas the granules of Indian catechus and other like coloring materials are opaque. These differences constitute distinguishing characteristics whereby my products can be readily ascertained by those familiar with this art, since, as I believe, colors possessing these characteristics have never before been produced. The colors are of the kind known as "fast" colors, which can be destroyed only by the most violent agencies. When used to charge silk, they do not alter its touch as extracts having an alkaline basis do. They do not harden cotton fabrics, and they color wood without "packing" it, as it is called—i. e., giving it a felty nature. After the first product or extract above mentioned has been obtained the residues left in the bottom of the vat may, as already stated, be further treated with alkaline bodies in the same manner as they have been heretofore treated, for the purpose of obtaining an additional quantity of extract from the residues. The extract thus obtained, however, is of an inferior grade or quality, because it will inevitably be affected more or less by the alkali as heretofore used. But I have discovered that the substances composing the residues with which the coloring-matter is united, and the coloring-matter itself, are as soluble in fatty bodies as in the alkalies or alkaline bodies heretofore used. Instead, therefore, of using the alkalies, I proceed as follows to obtain an additional new and useful coloring-matter: I first pour upon the residues when still wet a quantity of any animal or vegetable oil or equivalent fatty substance. The proportion of such fatty body to the residues will be determined by the quantity of coloring-matter which remains in the residues. For instance, assuming that one-third of the coloring-matter remains in the residues, then I use about a pound of oil to one hundred pounds of residues. From this the proportion of oil may be estimated. The more color remaining the more oil should be used. The kinds of oil which I prefer to use, having found them well adapted to the purpose, are rape-seed and poppy-oil. I then add water, to about one hundred pounds of the residues about one hundred and fifty quarts of water, and bring the mass to a boiling point, meantime stirring it in order to maintain the mixture as nearly as possible in a state of emulsion. When the liquor is sufficiently colored, I gradually saturate the oil or the fatty substance by means of alkaline liquor of known strength, using no more of it than just sufficient to saponify the oil or fatty body. When the saponification is complete, the decoction will become limpid. I then continue the boiling until all the coloring-matter is extracted, which will be in the neighborhood of one hour. I then draw off the liquor and evaporate as usual to obtain the desired extract. This extract will be found much more valuable than that obtained by the use of alkalies as formerly used, because, although a small percentage of alkali has been used, still it is used not for the purpose of dissolving the coloring-matter, but to saponify the oily or fatty matter, and because so little is used it has practically no effect upon the coloring-matter.

Instead of using the oily or fatty substance and the alkaline solution, as stated, thus effecting saponification and practically producing a soap compound in the mass, I can use as a substitute therefor, and produce the same results, a solution of ordinary soap, either potash or soda, the percentage of alkali being so small in it, and it also being saponified, that it does not act detrimentally on the resulting extract.

I have also found it practical and advantageous when desiring to produce cheaply a low grade of extract to combine the two operations—i. e., the fermentation or the oxidation with acids, as the case may be, and the treatment with soap—in one operation, and at the same time. To do this I first proceed with the oxidation, either by fermentation or the use of acids, as above stated, down to the boiling at the end of the first operation, and I then gradually add the soap compound, preferably in solution, and I then continue the boiling for a half hour or so, or, in other words, until all the coloring-matter has been extracted. A few hours' settling, and one, or at most two, filterings through filtering-cloth will clarify the resulting extract.

All the extracts obtained by me by the practice of the above processes obey the same reactives, produce the same shades, or at least shades of the same character, with the same chemical agents, these agents being used as now well understood by those skilled in this art—that is to say, by means of chromates and manganates of potash, sulphides, alkalines, and other agents which may be used for the same purpose these extracts produce all the reddish browns which may be required by the dyer. In the same manner by using ferric salts the purpleish grays may be produced. I may add also that these extracts produce, with zinc salts and salts of manganese, pale grays. This seems to be owing, however, to the fact that these salts always contain a greater or less quantity of iron. Finally, all the red tannic woods or plants containing coloring-matter may be treated by my process, either separately or several together, in order to obtain such reddish browns as may be desired, all of them being capable of production by my process. Also, the extracts obtained by the red tannic plants can be combined with the extracts from the yellow tannic plants, or with other coloring-matters, to produce such color or shade of color as may be desired.

I do not limit myself to the specific proportions mentioned, because they can be somewhat departed from, depending on the character of the wood or plant being treated, and yet the advantages of my invention be secured.

I do not disclaim nor abandon the processes herein described, they being claimed by me in another application for Letters Patent therefor.

Having thus described my invention, I claim—

1. As a new article of manufacture, the within-described acid extract produced from so-called "red-colored tannic woods and plants."

2. As a new article of manufacture for dyeing, &c., the within-described soap extract made from the so-called "red-colored tannic woods and plants," substantially as set forth.

Signed at New York city, in the county of New York and State of New York, this 7th day of August, A. D. 1884.

MICHEL EDMOND SAVIGNY.

Witnesses:
D. IRA BAKER,
AUG. NÖEL, Jr.